(12) United States Patent
Achten et al.

(10) Patent No.: US 11,007,711 B2
(45) Date of Patent: May 18, 2021

(54) PROCESS FOR MANUFACTURING AN OBJECT, AND USE OF A RADICALLY CROSS-LINKABLE RESIN IN AN ADDITIVE MANUFACTURING PROCESS

(71) Applicant: Covestro Deutschland AG, Leverkusen (DE)

(72) Inventors: Dirk Achten, Leverkusen (DE); Thomas Buesgen, Leverkusen (DE); Roland Wagner, Leverkusen (DE); Florian Stempfle, Cologne (DE); Michael Ludewig, Odenthal (DE); Christoph Tomczyk, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/761,287

(22) PCT Filed: Nov. 8, 2018

(86) PCT No.: PCT/EP2018/080674
§ 371 (c)(1),
(2) Date: May 4, 2020

(87) PCT Pub. No.: WO2019/092140
PCT Pub. Date: May 16, 2019

(65) Prior Publication Data
US 2021/0046696 A1    Feb. 18, 2021

(30) Foreign Application Priority Data

Nov. 9, 2017  (EP) .................................... 17200718

(51) Int. Cl.
| | | |
|---|---|---|
| *B29C 64/135* | (2017.01) | |
| *B33Y 10/00* | (2015.01) | |
| *B33Y 70/00* | (2020.01) | |
| *B33Y 80/00* | (2015.01) | |
| *C08G 18/24* | (2006.01) | |
| *C08G 18/48* | (2006.01) | |
| *C08G 18/78* | (2006.01) | |
| *C08G 18/18* | (2006.01) | |
| *B29C 64/00* | (2017.01) | |

(52) U.S. Cl.
CPC ............ *B29C 64/135* (2017.08); *B29C 64/00* (2017.08); *B33Y 10/00* (2014.12); *B33Y 70/00* (2014.12); *B33Y 80/00* (2014.12); *C08G 18/246* (2013.01); *C08G 18/4854* (2013.01); *C08G 18/7887* (2013.01); *C08G 18/18* (2013.01); *C08G 2350/00* (2013.01)

(58) Field of Classification Search
CPC ....... B29C 64/135; B29C 64/00; B33Y 80/00; B33Y 10/00; B33Y 70/00; C08G 18/7887; C08G 18/246; C08G 18/4854; C08G 18/18; C08G 2350/00
See application file for complete search history.

(56) References Cited

U.S. PATENT DOCUMENTS

| | | | |
|---|---|---|---|
| 4,265,798 A | 5/1981 | Mishra | |
| 4,379,905 A | 4/1983 | Stemmler et al. | |
| 4,487,928 A | 12/1984 | Richter et al. | |
| 4,604,418 A | 8/1986 | Shindo et al. | |
| 4,663,377 A | 5/1987 | Hombach et al. | |
| 5,252,696 A | 10/1993 | Laas et al. | |
| 9,926,402 B2 | 3/2018 | Laas et al. | |
| 2004/0068081 A1* | 4/2004 | Facke ................ | C08G 18/7887 528/73 |

(Continued)

FOREIGN PATENT DOCUMENTS

| | | |
|---|---|---|
| DE | 3240613 A1 | 5/1984 |
| DE | 102004050868 A1 | 4/2006 |

(Continued)

OTHER PUBLICATIONS

International Search Report, PCT/EP2018/080674, dated Feb. 15, 2019, Authorized officer: Ute Neugebauer.
European Polymer Journal, vol. 16, 147-148 (1979).

*Primary Examiner* — Rabon A Sergent
(74) *Attorney, Agent, or Firm* — Jed C. Benson

(57) ABSTRACT

A process for manufacturing an object involves the steps of: I) depositing a radically cross-linked resin on a carrier so that a layer of a structuring material joined to the carrier is obtained, said layer corresponding to a first selected cross-section of the object; II) depositing a radically cross-linked resin on a previously applied layer of the structuring material so that an additional layer of the structuring material is obtained which corresponds to a further selected cross-section of the object and which is joined to the previously applied layer; III) repeating step II) until the object is formed, wherein the deposition of a radically cross-linked resin in steps I) and II) includes the application of a radically cross-linkable resin to the carrier or the previously applied layer and is performed at least in step II) by applying energy to a selected region of a radically cross-linkable resin, corresponding to the selected cross-section of the object, the radically cross-linkable resin having a viscosity (23° C., DIN EN ISO 2884-1) of ≥5 mPas to ≤100,000 mPas. The invention further relates to the use of such a resin in an additive manufacturing process. The radically cross-linkable resin comprises a curable component which is obtained by reacting a polyisocyanate or a polyisocyanate descendant containing at least one oxadiazine trione group (formula I) with a compound that contains acrylate, methacrylate or vinyl ether double bonds and 25 Zerewitinoff active H atoms.

15 Claims, No Drawings

(56) References Cited

U.S. PATENT DOCUMENTS

2011/0089610 A1\* 4/2011 El-Siblani ............. B29C 64/264
  264/401
2018/0133953 A1\* 5/2018 Achten ................ C09D 175/14

FOREIGN PATENT DOCUMENTS

| EP | 0100129 A1 | 2/1984 |
| EP | 2636511 A1 | 9/2013 |
| GB | 809809 A | 3/1959 |
| GB | 1145952 A | 3/1969 |
| GB | 1386399 A | 3/1975 |
| GB | 1391066 A | 4/1975 |
| GB | 2221465 A | 2/1990 |
| GB | 2222161 A | 2/1990 |
| WO | WO 2004033522 A1 | 4/2004 |

\* cited by examiner

PROCESS FOR MANUFACTURING AN OBJECT, AND USE OF A RADICALLY CROSS-LINKABLE RESIN IN AN ADDITIVE MANUFACTURING PROCESS

CROSS-REFERENCE TO RELATED APPLICATION

This application is a national stage application under 35 U.S.C. § 371 of PCT/EP2018/080674, filed Nov. 8, 2018, which claims the benefit of European Application No. 17200718, filed Nov. 9, 2017, each of which is incorporated herein by reference.

FIELD

The present invention relates to a process for producing an article, comprising the steps of:
I) depositing a free-radically crosslinked resin on a carrier to obtain a ply of a build material joined to the carrier that corresponds to a first selected cross section of the article;
II) depositing a free-radically crosslinked resin onto a previously applied ply of the build material to obtain a further ply of the build material that corresponds to a further selected cross section of the article and which is joined to the previously applied ply;
III) repeating step II) until the article is formed;
wherein the depositing of a free-radically crosslinked resin in step I) and step III) comprises an application of a free-radically crosslinkable resin to the carrier/preceding ply and, in step II) at least, is effected by introducing energy to a selected region of the free-radically crosslinkable resin corresponding to the respectively selected cross section of the article, and
wherein the free-radically crosslinkable resin has a viscosity (23° C., DIN EN ISO 2884-1) of ≥5 mPas to ≤100 000 mPas. The invention further relates to the use of such a resin in an additive manufacturing process.

BACKGROUND

WO 2004/033522 A1 discloses a process for producing a polyisocyanate or a polyisocyanate-derived product containing at least one allophanate group that, at the oxygen atom of the allophanate group attached via two single bonds, bears at least one acrylate, methacrylate or vinyl ether double bond, characterized in that a polyisocyanate or a polyisocyanate-derived product containing at least one oxadiazinetrione group (formula 1)

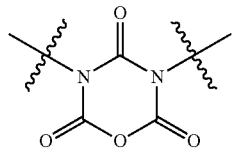

(Formula 1)

reacts with an alcohol containing an acrylate, methacrylate or vinyl ether double bond at temperatures between −20 to 100° C. The patent application likewise relates to coating systems, adhesive systems, curable compound systems and sealing compounds containing compounds prepared by said process.

SUMMARY

It is an object of the present invention to at least partly overcome at least one disadvantage of the prior art. It is a further object of the invention to provide an additive manufacturing process in which the articles produced are able to exhibit high resolution coupled with high strength. Finally, it is an object of the invention to be able to produce such articles in a manner that is as cost-efficient and/or individualized and/or economical with resources as possible.

The object is achieved in accordance with the invention by a process as claimed in claim 1 and a use as claimed in claim 13. Advantageous developments are specified in the dependent claims. They may be freely combined, unless the opposite is clearly evident from the context.

What is proposed in accordance with the invention is a process for producing an article, comprising the steps of:
I) depositing a free-radically crosslinked resin on a carrier to obtain a ply of a build material joined to the carrier that corresponds to a first selected cross section of the article;
II) depositing a free-radically crosslinked resin onto a previously applied ply of the build material to obtain a further ply of the build material that corresponds to a further selected cross section of the article and which is joined to the previously applied ply;
III) repeating step II) until the article is formed;
wherein the depositing of a free-radically crosslinked resin in step I) and step III) comprises an application of a free-radically crosslinkable resin to the carrier/preceding ply and, in step II) at least, is effected by introducing energy to a selected region of the free-radically crosslinkable resin corresponding to the respectively selected cross section of the article, and
wherein the free-radically crosslinkable resin has a viscosity (23° C., DIN EN ISO 2884-1) of ≥5 mPas to ≤100 000 mPas and wherein
the free-radically crosslinkable resin includes a curable component that is obtained by reacting a polyisocyanate or a polyisocyanate-derived product containing at least one oxadiazinetrione group (formula 1)

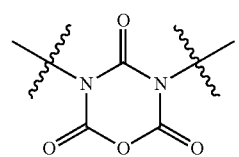

(Formula 1)

with a compound containing acrylate, methacrylate or vinyl ether double bonds that has Zerewitinoff-active hydrogen atoms.

DETAILED DESCRIPTION

In the context of the present invention, the material from which the precursor is obtained in the additive manufacturing process is referred to generally as "build material".

The construction of the article can be achieved by means of ray optics-based additive manufacturing processes such as the inkjet process, stereolithography or the DLP (digital light processing) process and is represented by steps I), II), and III). Step I) of the process comprises depositing a free-radically crosslinked resin on a carrier. This is usually the first step in inkjet, stereolithography and DLP processes. In this way, a ply of a build material bonded to the carrier that corresponds to a first selected cross section of the precursor is obtained. The build material is preferably joined to the carrier such that it can be detached from the carrier at any time, in particular after production of the article, preferably without the article being deformed.

As per the instructions for step III), step II) is repeated until the desired precursor is formed. Step II) comprises depositing a free-radically crosslinked resin onto a previously applied ply of the build material to obtain a further ply of the build material that corresponds to a further selected cross section of the precursor and which is joined to the previously applied ply. The previously applied ply of the build material may be the first ply from step I) or a ply from a previous iteration of step II).

According to the invention, a free-radically crosslinked resin—at least in step II) (and preferably in step I too)—is deposited through exposure and/or irradiation of a selected region of a free-radically crosslinkable resin corresponding to the cross section of the article selected in each instance. This may be either by selective exposure (stereolithography, DLP) of the resin or by selective application of the resin followed by an exposure step which, on account of the preceding selective application of the resin, no longer needs to be selective (inkjet process). Deposition here includes both the application of the free-radically crosslinkable resin and the at least partial exposure and/or irradiation thereof. The application of the free-radically crosslinkable resin can be carried out by any method known to those skilled in the art for free-radically crosslinkable resins. The application of the free-radically crosslinkable resin is preferably selected from the group consisting of deposition, printing, knife-coating, screen printing, or a combination of at least two thereof.

In the context of the present invention the terms "free-radically crosslinkable resin" and "free-radically crosslinked resin" are used. The free-radically crosslinkable resin is converted here into the free-radically crosslinked resin by exposure and/or irradiation, which triggers free-radical crosslinking reactions. In this context, "exposure" is understood as meaning the introduction of light in the range between near-IR and near-UV light (wavelengths of 1400 nm to 315 nm). The remaining shorter wavelength ranges are covered by the term "irradiation", for example far-UV light, x-radiation, gamma radiation and also electron beams.

The respective cross section is expediently selected by a CAD program with which a model of the article to be produced has been created. This operation is also known as "slicing" and serves as a basis for controlling the exposure and/or irradiation of the free-radically crosslinkable resin.

The free-radically crosslinkable resin has a viscosity (23° C., DIN EN ISO 2884-1) of ≥5 mPas to ≤100 000 mPas. It should thus be regarded as a liquid resin at least for the purposes of additive manufacturing. The viscosity is preferably ≥50 mPas to ≤20 000 mPas, more preferably ≥500 mPas to ≤5000 mPas.

Polyisocyanates or polyisocyanate-derived products obtained by reacting an oxadiazinetrione-functional polyisocyanate or polyisocyanate-derived product with an alcohol containing an acrylate, methacrylate or vinyl ether double bond (preferably at temperatures between −20° C. to 100° C. and with the addition of a basic catalyst and one or more stabilizers) can be described in more detail by formula 2:

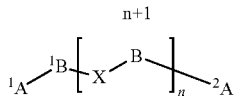

(Formula 2)

The placeholders in formula 2 are explained as follows. $^1A$, $^2A$ are isocyanate or are identical or different structures of isocyanate-derived products that contain iminooxadiazinedione, isocyanurate, uretdione, urethane, allophanate, biuret urea, urea or oxadiazinetrione structures and bear the radicals to $^1B$ to $^{n+1}B$ mentioned below in nitrogen positions.

$^1B$ to $^{n+1}B$ are identical or different radicals formed by notional abstraction of the two isocyanate groups of an aliphatic, cycloaliphatic or araliphatic diisocyanate.

X is one of the structures X-1 and/or X-2, and also optionally a proportion of identical or different residues of isocyanate-derived products that contain iminooxadiazinedione, isocyanurate, uretdione, urethane, allophanate, biuret urea, urea or oxadiazinetrione structures:

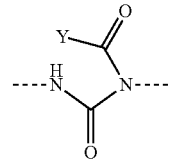

(Structure X-1)

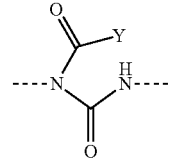

(Structure X-2)

Y is an organic radical that contains at least one activated double bond; n is a number greater than one and smaller than 20 and is the mean of all molecules of formula 2 present in the compound.

Substructures $^1A$, $^2A$ are isocyanate or are identical or different structures of isocyanate-derived products of the iminooxadiazinedione, isocyanurate, uretdione, urethane, allophanate, biuret urea, urea or oxadiazinetrione structural type and bear the radicals B mentioned below in nitrogen positions. $^1A$, $^2A$ are preferably isocyanate groups, blocked isocyanate groups or urethane groups. Preferred urethane groups are urethanes that have an unsaturated radical Y and are formed by reaction of each molecule of H-Y with an isocyanate group, preference being given to urethanes bearing identical radicals so that $^1A$ is the same as $^2A$. $^1A$, $^2A$ are preferably isocyanate groups, preferably where $^1A=^2A$.

Substructures $^1B$ to $^{n+1}B$ are those radicals that are formed by notional abstraction of the two isocyanate groups of an aliphatic, cycloaliphatic or araliphatic diisocyanate and may be incorporated into the binder through the reaction of an oxadiazinetrione based on one or more of said diisocyanates.

The contents of the functional groups in the products of the process according to the invention, determined by $^{13}C$-NMR spectroscopy with quantitative evaluation only of the functional groups based on the carbon atoms attached to oxygen and nitrogen atoms, are preferably:

5-50% allophanate (as present in structures X-1 and X-2),
0-5% uretdione
0.1-30% oxadiazinetrione, preferably 0.2-20%, more preferably 0.5-10%
1-60% urethane
0-35% isocyanurate
0-30% isocyanate Preferred starting materials containing at least one oxadiazinetrione group for the synthesis of the polyisocyanates or polyisocyanate-derived products to be used according to the invention may be prepared by reacting aliphatic, cycloaliphatic, and/or araliphatic di- or polyisocyanates with carbon dioxide. Examples of preferred aliphatic, cycloaliphatic, and/or araliphatic diisocyanates include ethylene diisocyanate, 1,4-diisocyanatobutane, 1,5-diisocyanatopentane, 1,6-diisocyanatohexane, trimethylhexane diisocyanate, 1,3- and 1,4-bis(isocyanatomethyl)cyclohexane, isophorone diisocyanate, 4,4-diisocyanatodicyclohexylmethane and the araliphatic diisocyanates xylylene 1,3- and 1,4-diisocyanate (XDI) or mixtures thereof. Preference is given to 1,6-diisocyanatohexane and 1,5-diisocyanatopentane.

Preferred polyisocyanates containing at least one oxadiazinetrione group conforming to formula 3:

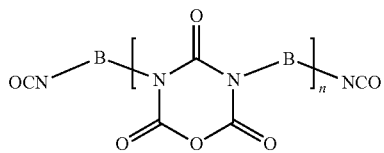

(Formula 3)

where n, in the oxadiazinetriones preferred here as reactants for the synthesis of the binders according to the invention, correspond in formula 3 to a number greater than or equal to 1 and less than 20, but preferably molecules having different are present in the same polyisocyanate at the same time. Preference is given to those oxadiazinetriones having a mean $$n = \frac{\Sigma_i \, n_i}{i}$$

value of less than 10, preferably less than 5 or preferably less than 3.

Such polyisocyanates are commercially available (Baymicron Oxa WM06). The preparation is described in German patent application DE 167066. The preparation of the oxadiazinetrione according to this application results in the formation of 0.1-5% by weight of uretdione groups, depending on the reaction conditions.

Preferred polyisocyanate-derived products containing at least one oxadiazinetrione group conform to formula 4:

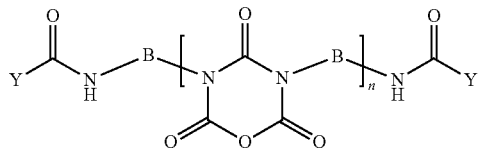

(Formula 4)

They are preferably prepared by reacting polyisocyanates containing at least one oxadiazinetrione group conform to formula 3 with compounds H—Y.

The substructure Y is a radical that contains at least one double bond polymerizable by electromagnetic radiation and formed by notional abstraction of the proton from the isocyanate-reactive functional group of said radical. Isocyanate-reactive functional group means alcohol (—OH), amine (NH) or thiol (SH) groups, preference being given to amine and alcohol groups and particular preference to alcohol groups. Double bonds polymerizable by electromagnetic radiation mean vinyl, vinyl ether, propenyl, allyl, maleyl, fumaryl, maleimido, dicyclopentadienyl, acrylamido, acryloyl and methacryloyl groups, preference being given to vinyl ether, acryloyl, and methacryloyl groups and particular preference to acryloyl groups.

The allophanate group described in structure X-1 and X-2 and the urethane groups optionally present in structures $^1$A, $^2$A are based on the substructure Y, this being based on the alcohol notionally derivable from Y that is used with particular preference; mixtures of different alcohols may also be used.

In accordance with the invention, the polyisocyanates or polyisocyanate-derived products containing at least one oxadiazinetrione group are reacted with, for example, these alcohols.

Preferred alcohols here are 2-hydroxyethyl (meth)acrylate, polyethylene oxide mono(meth)acrylate (PEA6/PEM6, Laporte Performance Chemicals Ltd.), polypropylene oxide mono(meth)acrylate (PPA6, PPMSS, Laporte Performance Chemicals Ltd.), polyalkylene oxide mono(meth)acrylate (PEM63P, Laporte Performance Chemicals Ltd.), poly(ε-caprolactone) mono(meth)acrylates such as Tone M100 (Union Carbide), 2-hydroxypropyl (meth)acrylate, 4-hydroxybutyl (meth)acrylate, 3-hydroxy-2,2-dimethylpropyl (meth)acrylate, the mono-, di- or tetraacrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or technical-grade mixtures thereof; preference is given to acrylated monoalcohols such as glycerol di(meth)acrylate, trimethylolpropane di(meth)acrylate, pentaerythritol tri(meth)acrylate, dipentaerythritol penta(meth)acrylate. Also in accordance with the invention are alcohols that can be obtained from the reaction of acids containing double bonds with epoxy compounds optionally containing double bonds such as the reaction products of (meth)acrylic acid with glycidyl (meth)acrylate or bisphenol A diglycidyl ether.

In addition to allophanate structures X-1 and X-2, the substructures X may optionally contain a proportion of further identical or different radicals of isocyanate-derived products that contain iminooxadiazinedione, isocyanurate, uretdione, urethane, allophanate, biuret, urea or oxadiazinetrione structures. Preferred structures are those of the urethane type formed by reacting a dialcohol with isocyanate groups. Preference is given to using ethylene glycol, diethylene glycol, triethylene glycol, tetraethylene glycol, dipropylene glycol, tripropylene glycol, short-chain polyethers based on ethylene oxide, propylene oxide or mixtures thereof, 1,2- and 1,3-propanediol, the isomeric butanediols, neopentyl glycol, 1,6-hexanediol, 2-ethyl-1,3-hexanediol, cyclohexanedimethanol, dodecanediol, mono(meth)acrylates of trimethylolpropane, trimethylolethane, and glycerol, the epoxidized and propoxylated derivatives thereof, and the technical-grade mixtures obtainable by esterification of the same alcohols with acrylic acid, and 2-aminoethanol and the isomeric aminopropanols. Also used are short-chain polyester diols such as ε-caprolactone-extended diols such as ethanediol, 1,2- and 1,3-propanediol, the isomeric butanediols, neopentyl glycol, 1,6-hexanediol, 2-ethyl-1,3-hexanediol, cyclohexanedimethanol. Preference is given to diols such as ethanediol, hexanediol, mono(meth)

acrylates of trimethylolpropane and of glycerol, and particular preference to propanediol, butanediol, hexanediol and neopentyl glycol.

For the synthesis, a charge of the oxadiazinetrione-containing polyisocyanate or polyisocyanate-derived products can be heated to −20 to 100° C., preferably to 0 to 100° C. or 20 to 80° C. or more preferably to 40 to 60° C. and the required amount of stabilizer dissolved therein. Addition of the alcohol containing an activated double bond and a suitable catalyst is followed by the spontaneous evolution of carbon dioxide, which is given off as a gas. The removal of the carbon dioxide from the reaction mixture can be accelerated by applying a vacuum, preferably in a range of 800 and 0 mbar or preferably of 200 and 10 mbar, or by passage of an inert gas such as air or nitrogen. Preferably, a vacuum of 200 to 10 mbar is applied toward the end of the reaction and maintained until no more evolution of carbon dioxide can be detected.

An inert solvent such as toluene, xylene, isooctane, acetone, butanone, methyl isobutyl ketone, ethyl acetate, butyl acetate, tetrahydrofuran, N-methylpyrrolidone, dimethylacetamide, dimethylformamide may be used in the reaction, but preferably no solvent is added. Alternatively, the reaction may also be carried out in diluents that likewise (co)polymerize during the UV curing. Suitable reactive diluents are described in P. K. T. Oldring (Ed.), Chemistry & Technology of UV & EB Formulations For Coatings, Inks & Paints, Vol. 2, 1991, SITA Technology, London, pp. 237-285. Examples include the esters of acrylic acid or methacrylic acid, preferably acrylic esters of the alcohols that follow. Monohydric alcohols are the isomeric butanols, pentanols, hexanols, heptanols, octanols, nonanols, and decanols, and also cycloaliphatic alcohols such as isobornol, cyclohexanol, and alkylated cyclohexanols, dicyclopentanol, arylaliphatic alcohols such as phenoxyethanol and nonylphenylethanol, and also tetrahydrofurfuryl alcohols. Alkoxylated derivatives of said alcohols may also be used. Examples of dihydric alcohols are alcohols such as ethylene glycol, 1,2-propanediol, 1,3-propanediol, diethylene glycol, dipropylene glycol, the isomeric butanediols, neopentyl glycol, 1,6-hexanediol, 2-ethylhexanediol, and tripropylene glycol or else alkoxylated derivatives of said alcohols. Preferred dihydric alcohols are 1,6-hexanediol, dipropylene glycol, and tripropylene glycol. Trihydric alcohols are glycerol or trimethylolpropane or the alkoxylated derivatives thereof. Tetrahydric alcohols are pentaerythritol or the alkoxylated derivatives thereof. Preferred alcohols have a low hydroxyl content, preferably less than 20 mg/g KOH.

Generally suitable catalysts for the reaction of oxadiazinetriones are compounds having a $pK_a$ of >7.5. For each alcohol containing a double bond that is used, there are different catalysts that are more suitable. In particular, the reaction conversion on the oxadiazinetrione ring and the tendency to polymerization of a reaction mixture containing the catalyst are strongly influenced by the choice of catalyst and amount of catalyst. Above all, the tendency of common stabilizers to themselves react with the oxadiazinetrione ring or with the isocyanate groups plays a key role here. Preference is given to using the catalysts in a range from 0.001 to 5.0% by weight or preferably from 0.01 to 2.0% by weight or preferably from 0.05 to 0.5% by weight based on the total amount of catalyst-containing reaction mixture used.

Suitable catalysts are tertiary amines such as trimethylamine, triethylamine, tributylamine, bis(isopropyl)ethylamine, N,N-dimethylbenzylamine, 1,5-diazabicyclo[4.3.0]non-5-ene (DBN), 1,8-diazabicyclo[5.4.0]undec-7-ene (DBU), tetramethylbutanediamine, tetramethylpropanediamine, dimethylaminoaryl compounds such as dimethylaminobenzene, dimethylaminopyridine; alkali metal and alkaline earth metal salts of carbonic acid, formic acid, acetic acid, propionic acid, benzoic acid, and substituted benzoic acids, and also alkoxides of aliphatic and aromatic hydroxyl compounds such as sodium phenoxide and sodium methoxide. Cyclic aliphatic and cyclic aromatic nitrogen compounds are also used, such as $C_1$-$C_4$ N-alkylpyrroles, N-alkylpyrrolines, N-alkylpyrrolidines, N-alkylpyrazoles, N-alkylimidazoles, N-alkylimidazolines, N-alkylimidazolidines, the isomeric triazoles, the optionally alkylated pyrimidines, pyridazines, the isomeric triazines, quinolines, isoquinolines, quinoxalines and acridines. Preferred catalysts are tertiary amines such as trimethylamine, triethylamine, tributylamine, bis (isopropyl)ethylamine, N,N-dimethylbenzylamine, 1,5-diazabicyclo[4.3.0]non-5-ene (DBN), 1,8-diazabicyclo[5.4.0] undec-7-ene (DBU), particularly preferred catalysts are triethylamine, bis(isopropyl)ethylamine, 1,8-diazabicyclo [5.4.0]undec-7-ene (DBU).

Synthesis examples are given in patent application WO 2004/033522 A1.

In addition to the curable component, the free-radically crosslinkable resin may also include a non-curable component in which additives such as fillers, UV stabilizers, free-radical inhibitors, antioxidants, mold-release agents, water scavengers, slip additives, defoamers, leveling agents, rheology additives, flame retardants and/or pigments are combined. These auxiliaries and additives, excluding fillers and flame retardants, are typically present in an amount of less than 10% by weight, preferably less than 5% by weight or more preferably up to 3% by weight based on the free-radically crosslinkable resin. Flame retardants are typically present in amounts of not more than 70% by weight, preferably not more than 50% by weight or more preferably not more than 30% by weight, calculated as the total amount of flame retardants used based on the total weight of the free-radically crosslinkable resin.

Examples of suitable fillers are $AlOH_3$, $CaCO_3$, metal pigments such as $TiO_2$ and other known customary fillers. These fillers are preferably used in amounts of not more than 70% by weight, preferably not more than 50% by weight, or preferably not more than 30% by weight, calculated as the total amount of fillers used based on the total weight of the free-radically crosslinkable resin.

Suitable UV stabilizers may preferably be selected from the group consisting of piperidine derivatives such as 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl)suberate, bis (2,2,6,6-tetramethyl-4-piperidyl) dodecanedioate; benzophenone derivatives such as 2,4-dihydroxybenzophenone, 2-hydroxy-4-methoxybenzophenone, 2-hydroxy-4-octoxybenzophenone, 2-hydroxy-4-dodecyloxybenzophenone or 2,2'-dihydroxy-4-dodecyloxybenzophenone; benzotriazole derivatives such as 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl)phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl) phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides such as 2-ethyl-2'-ethoxyoxalanilide or 4-methyl-4'-methoxyoxalanilide; salicylic esters such as phenyl salicylate, 4-tert-butylphenyl salicylate, 4-tert-octylphenyl salicylate; cinnamic ester derivatives such as methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4-butoxybenzylidenemalonate. These preferred light stabilizers may be used either individually or in any desired combinations with one another.

Preferred UV stabilizers are those that completely absorb radiation having a wavelength <400 nm. These include the recited benzotriazole derivatives for example. Other preferred UV stabilizers are 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol and/or 2-(5-chloro-2H-benzotriazol-2-yl)-4,6-bis(1,1-dimethylethyl) phenol.

One or more of the UV stabilizers recited by way of example is optionally added to the free-radically crosslinkable resin in amounts of preferably 0.001 to 3.0% by weight or more preferably 0.005 to 2% by weight, calculated as the total amount of UV stabilizers used based on the total weight of the free-radically crosslinkable resin.

Suitable antioxidants are preferably sterically hindered phenols, which may be selected preferably from the group consisting of 2,6-di-tert-butyl-4-methylphenol (ionol), pentaerythritol tetrakis(3-(3,5-di-tert-butyl-4-hydroxyphenyl) propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. These may be used either individually or in any desired combinations with one another as required. These antioxidants are used preferably in amounts of 0.01 to 3.0% by weight or more preferably 0.02 to 2.0% by weight calculated as the total amount of antioxidants used based on the total weight of the free-radically crosslinkable resins.

Suitable free-radical inhibitors/retarders are preferably those that specifically inhibit uncontrolled free-radical polymerization of the resin formulation outside the desired (irradiated) region. These are crucial for good contour sharpness and imaging accuracy in the precursor. Suitable free-radical inhibitors must be chosen according to the desired free-radical yield from the irradiation/exposure step and the polymerization rate and reactivity/selectivity of the double bond-bearing compounds. Examples of suitable free-radical inhibitors are 2,2-(2,5-thiophenediyl)bis(5-tert-butylbenzoxazole), phenothiazine, hydroquinones, hydroquinone ethers, quinone alkyds and nitroxyl compounds and mixtures thereof, benzoquinones, copper salts, catechols, cresols, nitrobenzene, and oxygen. These antioxidants are preferably used in amounts of 0.001% by weight to 3% by weight.

Embodiments and further aspects of the present invention are elucidated hereinbelow. These may be freely combined with one another, unless the opposite is clearly evident from the context.

In a preferred embodiment, the polyisocyanate or polyisocyanate-derived product containing at least one oxadiazinetrione group (formula 1) is prepared using hexamethylene 1,6-diisocyanate and/or pentamethylene 1,5-diisocyanate as reactant.

In a further preferred embodiment, the polyisocyanate or polyisocyanate-derived product containing at least one oxadiazinetrione group (formula 1) is prepared using a polyester alcohol containing (meth)acrylate groups.

In a further preferred embodiment, the curable component is present in the resin in a proportion of >0.1% by weight to ≤90% by weight or preferably ≥1% by weight to ≤70% by weight or preferably ≥5% by weight to ≤50% by weight based on the total weight of the resin.

The contents can be determined by $^{13}$C-NMR spectroscopy with quantitative evaluation only of the functional groups, based on the carbon atoms attached to oxygen and nitrogen atoms. As already stated, 0.2-20% by weight is preferable and 0.5-10% by weight more preferable.

In a further preferred embodiment, free isocyanate groups are present in the resin in a proportion of >0% by weight to ≤30% by weight or preferably ≥0.5% by weight to ≤20% by weight or more preferably ≥1% by weight to ≤10% by weight based on the total weight of the resin.

In a further preferred embodiment, functional groups having Zerewitinoff-active hydrogen atoms are present in the resin in a proportion of ≥0% by weight to ≤10% by weight or preferably ≥0.5 to ≤8% by weight or more preferably ≥2 to ≤6% by weight based on the total weight of the resin.

In a further preferred embodiment, free polymerization-active C=C double bonds are present in the resin in a proportion of >1% by weight to ≤10% by weight based on the total weight of the resin. Free polymerization-active C=C double bonds are present in the resin preferably in a proportion of 1.5 to 8% by weight or preferably 2 to 6% by weight based on the total weight of the resin.

In a further preferred embodiment, a further step IV) is carried out after step III):

IV) treating the article obtained in step III) under conditions sufficient for reaction of at least some of the isocyanate groups present in the free-radically crosslinked resin of the article obtained with further NCO groups or compounds having Zerewitinoff-active hydrogen atoms.

The treating in step IV) may in the simplest case be storage at room temperature (20° C.). Storage at a temperature above room temperature is also possible. During step IV), the NCO groups react with one another, resulting in further crosslinking of the already free-radically crosslinked material. This reaction results to some degree at least in trimerization to form isocyanurate groups. The present invention also encompasses the possibility that uretdione, allophanate, urea, urethane, biuret, iminooxadiazinedione, and/or oxadiazinetrione groups may also be formed from the NCO groups. Such side reactions may be specifically employed, for example, to influence the glass transition temperature Tg of the material obtained.

The reaction is preferably performed until ≤20%, preferably ≤10% and more preferably ≤5% of the NCO groups originally present in the curable component are still present. This can be determined by quantitative IR spectroscopy. It is further preferable if ≥50%, ≥60%, ≥70% or ≥80% of the isocyanate groups present in the curable component are converted into isocyanurate groups in step IV).

It is preferable that step IV) is performed only once the entirety of the build material of the article has reached its gel point. The gel point is considered to have been reached when, in a dynamic-mechanical analysis (DMA) with a plate/plate oscillation viscometer in accordance with ISO 6721-10 at 20° C., the graphs of the storage modulus G' and of the loss modulus G" intersect. The precursor is optionally subjected to further exposure and/or irradiation to bring free-radical crosslinking to completion. The free-radically crosslinked resin may have a storage modulus G' of ≥10⁶ Pa (DMA, plate/plate oscillation viscometer according to ISO 6721-10 at 20° C. and an angular frequency of 1/s).

Preferred conditions are heating of the article to a temperature of ≥60° C. This temperature is preferably ≥80° C. to ≤250° C., more preferably ≥90° C. to ≤190° C. The chosen temperature or chosen temperature range in step IV) may be maintained for example for ≥5 minutes to ≤48 hours, preferably ≥15 minutes to ≤24 hours, and more preferably ≥1 hour to ≤12 hours.

In a further preferred embodiment, the free-radically crosslinkable resin further includes a free-radical initiator and/or an isocyanate trimerization catalyst. To prevent an undesired increase in the viscosity of the free-radically crosslinkable resin, it is possible to add the free-radical initiator and/or isocyanate trimerization catalyst to the resin only immediately before commencement of the process according to the invention.

Potential free-radical initiators include thermal and/or photochemical free-radical initiators (photoinitiators). It is also possible to use thermal and photochemical free-radical initiators at the same time. Examples of suitable thermal free-radical initiators are azobisisobutyronitrile (AIBN), dibenzoyl peroxide (DBPO), di-tert-butyl peroxide and/or inorganic peroxides such as peroxodisulfates.

In the case of the photoinitiators, a basic distinction is made between two types, the unimolecular type (I) and the bimolecular type (II). Examples of suitable type (I) systems are aromatic ketone compounds such as benzophenones in combination with tertiary amines, alkylbenzophenones, 4,4'-bis(dimethylamino)benzophenone (Michler's ketone), anthrone, and halogenated benzophenones or mixtures of said types. Also suitable are type (II) initiators such as benzoin and derivatives thereof, benzil ketals, acylphosphine oxides, 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones. Specific examples are Irgacure®500 (a mixture of benzophenone and 1-hydroxycyclohexyl phenyl ketone, from Ciba, Lampertheim, Del.), Irgacure®819 DW (phenylbis(2,4,6-trimethylbenzoyl)phosphine oxide, from Ciba, Lampertheim, Del.) or Esacure® KIP EM (oligo-[2-hydroxy-2-methyl-1-[4-(1-methylvinyl)phenyl]propanones], from Lamberti, Aldizzate, Italy), and bis(4-methoxybenzoyl)diethylgermane. Mixtures of these compounds may also be used.

It needs to be ensured that the photoinitiators have sufficient reactivity with respect to the radiation source used. Numerous commercially available photoinitiators are known. The entire wavelength range of the UV-VIS spectrum is covered by commercially available photoinitiators. Photoinitiators find use in the production of paints, printing inks and adhesives, and also in the dental sector.

In the process according to the invention, the photoinitiator is preferably used in a concentration, based on the amount of the curable component having olefinically-unsaturated double bonds used, of 0.01 to 6.0% by weight, or preferably of 0.05 to 4.0% by weight or preferably of 0.1 to 3.0% by weight.

Suitable isocyanate trimerization catalysts are in principle all compounds that accelerate the addition of isocyanate groups to form isocyanurate groups and thus crosslink the isocyanate-containing molecules present.

Examples of suitable isocyanate trimerization catalysts are simple tertiary amines, such as triethylamine, tributylamine, N,N-dimethylaniline, N-ethylpiperidine or N,N'-dimethylpiperazine. Suitable catalysts also include the tertiary hydroxyalkylamines described in GB 2 221 465 such as triethanolamine, N-methyldiethanolamine, dimethylethanolamine, N-isopropyldiethanolamine and 1-(2-hydroxyethyl)pyrrolidine, or the catalyst systems disclosed by GB 2 222 161 that consist of mixtures of tertiary bicyclic amines such as DBU with simple low-molecular-weight aliphatic alcohols.

Likewise suitable as isocyanate trimerization catalysts is a plurality of different metal compounds. Suitable examples are the octoates and naphthenates of manganese, iron, cobalt, nickel, copper, zinc, zirconium, cerium or lead or mixtures thereof with acetates of lithium, sodium, potassium, calcium or barium that are described as catalysts in DE-A 3 240 613, the sodium and potassium salts of linear or branched alkanecarboxylic acids having up to 10 carbon atoms that are disclosed by DE-A 3 219 608, such as of propionic acid, butyric acid, valeric acid, caproic acid, heptanoic acid, caprylic acid, pelargonic acid, capric acid and undecyl acid, the alkali metal or alkaline earth metal salts of aliphatic, cycloaliphatic or aromatic mono- and polycarboxylic acids having 2 to 20 carbon atoms that are disclosed by EP-A 0 100 129, such as sodium benzoate or potassium benzoate, the alkali metal phenoxides disclosed by GB-A 1 391 066 and GB-A 1 386 399, such as sodium phenoxide or potassium phenoxide, the alkali metal and alkaline earth metal oxides, hydroxides, carbonates, alkoxides and phenoxides disclosed by GB-A 809 809, alkali metal salts of enolizable compounds and metal salts of weak aliphatic or cycloaliphatic carboxylic acids, such as sodium methoxide, sodium acetate, potassium acetate, sodium acetoacetate, lead 2-ethylhexanoate, and lead naphthenate, the basic alkali metal compounds complexed with crown ethers or polyether alcohols that are disclosed by EP-A 0 056 158 and EP-A 0 056 159, such as complexed sodium carboxylates or potassium carboxylates, the pyrrolidinone potassium salt disclosed by EP-A 0 033 581, the mono- or polynuclear complexes of titanium, zirconium and/or hafnium disclosed by application EP 13196508.9, such as zirconium tetra-n-butoxide, zirconium tetra-2-ethylhexanoate and zirconium tetra-2-ethylhexoxide, and tin compounds of the type described in European Polymer Journal, vol. 16, 147-148 (1979), such as dibutyltin dichloride, diphenyltin dichloride, triphenylstannanol, tributyltin acetate, tributyltin oxide, tin octoate, dibutyl(dimethoxy)stannane, and tributyltin imidazolate.

The isocyanate trimerization catalysts may be used in the process according to the invention either individually or in the form of any desired mixtures with one another.

Isocyanate trimerization catalysts that may be highlighted are sodium and potassium salts of aliphatic carboxylic acids having 2 to 20 carbon atoms in combination with complexing agents such as crown ethers or polyethylene glycols or polypropylene glycols and also aliphatically substituted tin compounds or phosphines.

In the process according to the invention, the isocyanate trimerization catalyst is preferably used in a concentration based on the amount of the curable component used of 0.0005 to 5.0% by weight, or preferably of 0.0010 to 2.0% by weight, or preferably of 0.0015 to 1.0% by weight.

The isocyanate trimerization catalysts used in the process according to the invention generally have sufficient solubility in the free-radically crosslinkable resin in the amounts that are required for initiation of the trimerization reaction. The isocyanate trimerization catalyst is therefore preferably added as the undissolved substance.

In a further preferred embodiment the free-radical initiator is selected from the group: α-hydroxyphenyl ketone, benzyl dimethyl ketal and/or 2,4,6-trimethylbenzoyldiphenylphosphine oxide, bis(4-methoxybenzoyl)diethylgermane (Ivocerin®)
and/or
the isocyanurate trimerization catalyst is selected from: potassium acetate, potassium acetate in combination with a crown ether, potassium acetate in combination with a polyethylene glycol, potassium acetate in combination with a polypropylene glycol, tin octoate, sodium phenoxide, potassium hydroxide, trioctylphosphine and/or tributyltin oxide.

In a further preferred embodiment, the surface of the article obtained in step III) or IV) is contacted with a compound having Zerewitinoff-active hydrogen atoms, excluding water occurring as natural air humidity in the atmosphere surrounding the precursor and/or the article. Surface functionalization can be achieved in a reaction of residual free NCO groups with such compounds. The compound having Zerewitinoff-active hydrogen atoms may be brought into contact with the surface of the precursor by for example immersion, spray application or spreading. A further possibility is contacting via the gas phase, for example using ammonia or water vapor. A catalyst may optionally accelerate the reaction.

Examples of compounds suitable as the functionalization reagent are alcohols, amines, acids, and derivatives thereof, epoxides, and in particular polyols such as sugars, polyacrylate polyols, polyester polyols, polyether polyols, polyvinyl alcohols, polycarbonate polyols, polyether carbonate polyols and polyester carbonate polyols, long-chain aliphatic alcohols, fluorinated or chlorinated alcohols. Further examples are polyacrylic acid, polyamides, polysiloxanes, polyacrylamides, polyvinylpyrrolidones, polyvinyl butyrate, polyketones, polyether ketones, polyacetals and polyamines Amines may also be used for specific formation of ureas.

It is preferable to use a long-chain alkyl alcohol, a long-chain (secondary) alkylamine, a fatty acid, an epoxidized fatty acid ester, a (per)fluorinated long-chain alcohol or mixtures thereof. "Long-chain" is to be understood here as meaning 6 or more carbon atoms, preferably 8 or more carbon atoms, more preferably 10 or more carbon atoms, in the longest chain of the compound. The preparation of modified polyisocyanates is known in principle and described for example in EP-A 0 206 059 and EP-A 0 540 985. It is carried out preferably at temperatures of 40° C. to 180° C.

In a further preferred embodiment the process has the following additional features:
the carrier is positioned inside a container and can be lowered vertically in the direction of gravity,
the container contains the free-radically crosslinkable resin in an amount sufficient to cover at least the carrier and crosslinked resin deposited on the carrier,
before each step II) the carrier is lowered by a predetermined distance so that a layer of the free-radically crosslinkable resin forms above the uppermost ply of the build material viewed in the vertical direction and
in step II) an energy beam exposes and/or irradiates the selected region of the layer of the free-radically crosslinkable resin corresponding to the respectively selected cross section of the precursor.

This embodiment accordingly covers the additive manufacturing process of stereolithography (SLA). The carrier may for example be lowered by a predetermined distance of ≥1 μm to ≤2000 μm in each case.

In a further preferred embodiment, the process has at least one, preferably two or more preferably all of the additional features:
the carrier is positioned inside a container and can be raised vertically counter to the direction of gravity,
the container provides the free-radically crosslinkable resin,
before each step II) the carrier is raised by a predetermined distance so that a layer of the free-radically crosslinkable resin forms below the lowermost layer of the build material viewed in the vertical direction and
in step II) a plurality of energy beams simultaneously expose and/or irradiate the selected region of the layer of the free-radically crosslinkable resin corresponding to the respectively selected cross section of the precursor.

This embodiment accordingly covers the additive manufacturing process of DLP technology if the plurality of energy beams generates the image to be provided by exposure and/or irradiation via an array of individually actuatable micromirrors. The carrier may be raised, for example, by a predetermined distance of ≥1 μm to ≤2000 μm in each case.

In a further preferred embodiment the process has the following additional features:
in step II) the free-radically crosslinkable resin is applied from a print head corresponding to the respectively selected cross section of the precursor and is subsequently exposed and/or irradiated.

This embodiment accordingly covers the additive manufacturing process of the inkjet method: the crosslinkable resin, optionally separately from the catalysts according to the invention, is applied selectively via one or more print heads and the subsequent curing by irradiation and/or exposure may be nonselective, for example via a UV lamp. The one or more print heads for applying the resin may be (modified) print heads for inkjet printing processes. The carrier may be configured to be movable away from the print head or the print head may be configured to be movable away from the carrier. The increments of the spacing movements between carrier and print head may, for example, be within a range from ≥1 μm to ≤2000 μm.

In this embodiment in particular, it is possible to construct a very thin precursor through a small number of repetitions of step II). This precursor may also be constructed on a substrate as carrier that fulfills a function in the later use of the article produced. It is then justified to refer to application of a surface onto the carrier or onto the substrate. The substrate may for example be an interior or exterior part of a vehicle. The inventive process according to this embodiment can then also be regarded as a painting process.

In a further preferred embodiment, the oxadiazinetrione still present after step III) reacts in step IV), with elimination of $CO_2$, by reaction with an alcohol and/or amine, preferably with an at least bifunctional alcohol and/or amine to form a 3D-printed foam with preferred mean pore diameters of ≤2 mm and preferably ≤1 mm.

In a further preferred embodiment, the oxadiazinetrione still present after step III) reacts in step IV), with elimination of $CO_2$, by thermal activation to form a 3D-printed foam with preferred mean pore diameters of ≤2 mm and preferably ≤1 mm.

A further aspect of the present invention is the use of a free-radically crosslinkable resin having a viscosity (23° C., DIN EN ISO 2884-1) of ≥5 mPas to ≤100 000 mPas in an additive manufacturing process, wherein the free-radically crosslinkable resin includes a curable component that is obtained by reacting a polyisocyanate or a polyisocyanate-derived product containing at least one oxadiazinetrione group (formula 1)

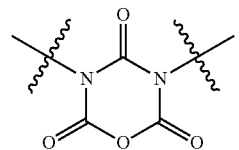

(Formula 1)

with a compound containing acrylate, methacrylate or vinyl ether double bonds that has Zerewitinoff-active hydrogen atoms.

With regard to the curable compound, the same considerations and preferred embodiments as above with regard to the process according to the invention apply to the use according to the invention. To avoid unnecessary repetition, they are not recited again. It is sufficient to note that, in a further preferred embodiment of the use in the curable component, the polyisocyanate or polyisocyanate-derived product containing the at least one oxadiazinetrione group is prepared using hexamethylene 1,6-diisocyanate and/or pentamethylene 1,5-diisocyanate and a polyester alcohol containing (meth)acrylate groups.

In a further preferred embodiment of the use, the additive manufacturing process comprises the exposure and/or irradiation of a previously selected region or applied region of the free-radically crosslinkable resin. The additive manufacturing process may for example be a stereolithography process or a DLP (digital light processing) process. In this context, "exposure" is understood as meaning the introduction of light in the range between near-IR and near-UV light (wavelengths of 1400 nm to 315 nm). The remaining shorter wavelength ranges are covered by the term "irradiation", for example far-UV light, x-radiation, gamma radiation and also electron beams.

The invention further relates to the use of products obtainable by a process according to the present invention as part(s) of body-supporting elements, orthopedic aids such as insoles, cushions, seats, mattresses, prostheses, exoskeletons, as an orthodontic aid such as a brace, bite guard, mouthguard, as a component of composite materials, as structural elements and/or replacement parts in the field of transport and industry.

EXAMPLES

Unless stated otherwise, all percentages refer to percent by weight (wt %).

NCO contents in % were determined by back-titration with 0.1 mol/l hydrochloric acid after reaction with butylamine in accordance with DIN EN ISO 11909.

Viscosity measurements were carried out using a plate-plate rotary viscometer, RotoVisko 1 from Haake, Del., at a shear rate of 40/s in accordance with ISO/DIN 3219:1990.

The ambient temperature of 23° C. at the time the experiments were performed is referred to as RT.

All chemicals and starting materials for which no information about the source of supply was clearly stated were obtained from Sigma-Aldrich.

Example 1: Inventive Binder

A 2000 ml four-necked flask fitted with a reflux condenser, heatable oil bath, mechanical stirrer, nitrogen inlet (dip tube), internal thermometer, and dropping funnel was charged with 532.6 g of Baymicron® Oxa WM06 (Covestro Deutschland AG, Leverkusen) and 5.33 g of triethylamine. To this was then added dropwise at RT, over a period of approx. 40 min, 700 g of slightly warmed (approx. 40° C.) Terathane® PTMEG 1000 (Invista™, Wichita, USA). This was accompanied by appreciable evolution of gas. The mixture was then heated to 55° C. and stirred for a further 100 min with passage of nitrogen until there was no more visible evolution of gas. It was then co-distilled three times, each time with approx. 300 g of toluene, on a rotary evaporator (30° C., decreasing pressure down to approx. 5 mbar), to remove excess triethylamine. For stabilization, 0.12 g of dibutyl phosphate was added, with subsequent stirring for approx. 30 min at 50° C.

A 1000 ml four-necked flask fitted with a reflux condenser, heatable oil bath, mechanical stirrer, internal thermometer, and dropping funnel was charged with 400 g of the resulting product, which was mixed with 0.22 g of 2,6-di-tert-butyl-4-methylphenol and 0.04 g of dibutyltin dilaurate and heated to 40° C. with stirring. To this was then added dropwise, over approx. 30 min, 41.55 g of hydroxyethyl methacrylate and stirring was continued for a further 30 min at 50° C.

An almost colorless viscous liquid having an NCO content of 2.8% and a viscosity of 39 270 mPas (23° C.) was obtained.

Example 2: Non-Inventive Binder

A 2000 ml four-necked flask fitted with a reflux condenser, heatable oil bath, mechanical stirrer, nitrogen inlet, internal thermometer, and dropping funnel was charged with 535.7 g of hexamethylene diisocyanate (Desmodur® H, Covestro Deutschland AG, Leverkusen) and 0.053 g of zinc octoate (Borchi® Kat 22, Borchers GmbH, Langenfeld, Del.) and heated to 60° C. with stirring. To this was then added dropwise, over approx. 30 min, 398.6 g of slightly warmed (40° C.) Terathane® PTMEG 1000 (Invista™, Wichita, USA). The temperature was then increased to 90° C. and stirring was continued for a further 6 hours until an NCO content of 21.5% was reached. After cooling to 60° C., 0.47 g of dibutyl phosphate was added and the mixture was stirred. The residual hexamethylene diisocyanate was then removed by thin-film distillation (150° C.; 0.5 mbar).

A 1000 ml four-necked flask fitted with a reflux condenser, heatable oil bath, mechanical stirrer, internal thermometer, and dropping funnel was charged with 560.6 g of the resulting product, which was mixed with 0.31 g of 2,6-di-tert-butyl-4-methylphenol and 0.06 g of dibutyltin dilaurate and heated to 40° C. with stirring. To this was then added dropwise, over approx. 30 min, 66.86 g of hydroxyethyl methacrylate and stirring was continued for a further 6 hours at 60° C.

A slightly yellowish viscous liquid having an NCO content of 3.0% and a viscosity of 63 640 mPas (23° C.) was obtained.

Printing Experiments

Formulations for the printing process were produced from the binders according to examples 1 and 2, the reactive diluent dipropylene glycol diacrylate (DPGDA) (obtained from abcr GmbH, Karlsruhe), the photoinitiator Omnirad BL 750 (obtained from iGM Resins, Waalwijk, NL), the UV blocker 2,2'-(2,5-thiophenediyl)bis(5-(1,1-dimethylethyl)

benzoxazole (obtained from Sigma-Aldrich). The composition of formulations A and B is shown in the table below:

| Formulation | A | B |
|---|---|---|
| Inventive binder according to example 1 | 60 g | |
| Non-inventive binder according to example 2 | | 60 g |
| Reactive diluent | 90 g | 90 g |
| Photoinitiator | 1.5 g | 1.5 g |
| UV blocker | 0.195 g | 0.195 g |
| Viscosity after mixing the formulation | 600 mPas | 3780 mPas |

The formulations were mixed in a lidded plastic cup using a Thinky, ARE250 planetary mixer at room temperature at a speed of rotation of 2000 rpm for about 2 minutes.

Formulation A having a viscosity of 600 mPas based on the inventive binder according to example 1 was used to fill the Ember DLP-based 3D printing machine from the manufacturer Autodesk. Test specimens having dimensions of 60×10×2 mm³ were successfully produced with the following print parameters: The wavelength for the exposure was 405 nm. The layer thickness was 50 μm in each case. The exposure time was 3.8 s for the first layer for bonding to the aluminum carrier baseplate, 2.8 s per layer for three intermediate bonded layers, and 1.7 s per layer for the subsequent further layers.

Formulation B having a viscosity of 3780 mPas based on the non-inventive binder according to example 2 could not be successfully printed on account of the high viscosity at the same mixing ratio of binder to reactive diluent as was used in formulation A.

The invention claimed is:

1. A process for producing an article, comprising:
   I) depositing a free-radically crosslinked resin on a carrier to obtain a ply of a build material joined to the carrier that corresponds to a first cross section of the article;
   II) depositing a free-radically crosslinked resin onto a previously applied ply of the build material to obtain a further ply of the build material that corresponds to a further cross section of the article and which is joined to the previously applied ply;
   III) repeating step II) until the article is formed;
   wherein depositing the free-radically crosslinked resin in step I) and step II) comprises applying a free-radically crosslinkable resin to the carrier or preceding ply, and wherein at least step II) comprises introducing energy to a region of the free-radically crosslinkable resin corresponding to a respective cross section of the article, and
   wherein the free-radically crosslinkable resin has a viscosity of ≥5 mPas to ≤100 000 mPas based on DIN EN ISO 2884-1 at 23° C.,
   wherein the free-radically crosslinkable resin includes a curable component obtained by reacting a polyisocyanate containing at least one oxadiazinetrione group according to Formula 1

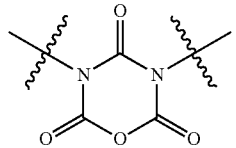

(Formula 1)

with a compound containing an acrylate double bond, a methacrylate double bond, or a vinyl ether double bond and having a Zerewitinoff-active hydrogen atom; and
   wherein the free-radically crosslinkable resin further includes an isocyanate trimerization catalyst.

2. The process as claimed in claim 1, wherein the polyisocyanate containing at least one oxadiazinetrione group according to Formula 1 is prepared using hexamethylene 1,6-diisocyanate and/or pentamethylene 1,5-diisocyanate as reactant.

3. The process as claimed in claim 1, wherein the polyisocyanate containing at least one oxadiazinetrione group according to Formula 1 is prepared using a polyester alcohol containing a methacrylate group.

4. The process as claimed in claim 1, wherein the curable component is present in the free-radically crosslinkable resin in a proportion of >0.1% by weight to ≤90% by weight based on a total weight of the free-radically crosslinkable resin.

5. The process as claimed in claim 1, wherein free isocyanate groups are present in the free-radically crosslinkable resin in a proportion of ≥0.5% by weight to ≤30% by weight based on a total weight of the free-radically crosslinkable resin.

6. The process as claimed in claim 1, wherein functional groups having Zerewitinoff-active hydrogen atoms are present in the free-radically crosslinkable resin in a proportion of ≥0% by weight to ≤10% by weight based on a total weight of the free-radically crosslinkable resin.

7. The process as claimed in claim 1, wherein free polymerization-active C=C double bonds are present in the free-radically crosslinkable resin in a proportion of >1% by weight to ≤10% by weight based on a total weight of the resin.

8. The process as claimed in claim 5, further comprising:
   IV) treating the article formed in step III) under conditions sufficient for reaction of at least some of the isocyanate groups present in the free-radically crosslinked resin of the article with further NCO groups or compounds having Zerewitinoff-active hydrogen atoms.

9. The process as claimed in claim 8, wherein ≥50% of the isocyanate groups present in the curable component are converted to isocyanurate groups in step IV).

10. The process as claimed in claim 1, wherein the free-radically crosslinkable resin further includes a free-radical initiator.

11. The process as claimed in claim 1, wherein a surface of the article formed in step III) is contacted with a compound having Zerewitinoff-active hydrogen atoms, excluding water occurring as natural air humidity in the atmosphere surrounding the article.

12. The process as claimed in claim 1, further comprising:
   lowering the carrier by a distance before each step II) and subsequently forming a layer of the free-radically crosslinkable resin above an uppermost ply of the build material, viewed in a vertical direction, and
   exposing and/or irradiating the region of the layer of the free-radically crosslinkable resin corresponding to the respective cross section of the article with an energy beam in step II),
   wherein the carrier is positioned inside a container and is vertically lowerable in the direction of gravity, and
   wherein the free-radically crosslinkable resin is provided to the carrier in the container.

13. The process as claimed in claim 1, further comprising:
   raising the carrier by a distance before each step II) and subsequently forming a layer of the free-radically crosslinkable resin below a lowermost ply of the build material viewed in a vertical direction, and simultaneously exposing and/or irradiating the region of the layer of the free-radically crosslinkable resin corresponding to the respective cross section of the article to a plurality of energy beams in step II), wherein the carrier is positioned inside a container and is vertically raisable counter to the direction of gravity, and wherein the free-radically crosslinkable resin is provided to the carrier in the container.

14. The process as claimed in claim 1, further comprising:

applying the free-radically crosslinkable resin from a print head and subsequently exposing and/or irradiating the region of the layer of the free-radically crosslinkable resin corresponding to the respective cross section of a precursor with an energy beam in step II).

15. An article obtained by a process as claimed in claim 1, wherein the article is at least a part or component of a body-supporting element, an orthopedic aid, a cushion, a seat, a mattress, a prosthetic, an exoskeleton, an orthodontic aid, a composite material, a structural element, or a replacement part.

\* \* \* \* \*